United States Patent [19]

Parsoneault et al.

[11] Patent Number: 5,601,125
[45] Date of Patent: Feb. 11, 1997

[54] VACUUM FILL TECHNIQUE FOR HYDRODYNAMIC BEARING

[75] Inventors: Norbert S. Parsoneault; Clinton A. Stark, both of Watsonville, Calif.

[73] Assignee: Seagate Technology, Inc., Scotts Valley, Calif.

[21] Appl. No.: 503,568

[22] Filed: Jul. 18, 1995

[51] Int. Cl.$^6$ .................................................. B65B 31/00
[52] U.S. Cl. ..................... 141/51; 141/5; 141/7; 141/59; 141/65; 141/82
[58] Field of Search ....................... 141/4, 5, 7, 8, 141/51, 59, 65, 82; 277/80, 135; 184/29, 6.22, 55.1, 55.2, 57; 384/100, 107

[56] References Cited

U.S. PATENT DOCUMENTS

| | | | |
|---|---|---|---|
| 4,061,163 | 12/1977 | Decker et al. | 141/7 |
| 4,713,925 | 12/1987 | Kafkis | 141/5 X |
| 4,753,276 | 6/1988 | Inaba et al. | 141/7 |
| 4,795,275 | 1/1989 | Titcomb et al. | 384/107 |
| 4,928,376 | 5/1990 | Pglitsch | 141/5 X |
| 5,067,528 | 11/1991 | Titcomb et al. | 141/4 |
| 5,112,142 | 5/1992 | Titcomb et al. | 384/107 |
| 5,524,728 | 6/1996 | Williams et al. | 184/29 |

*Primary Examiner*—J. Casimer Jacyna
*Attorney, Agent, or Firm*—Flehr, Hohbach, Test, Albritton & Herbert

[57] ABSTRACT

A method is provided eliminating the need for capping the motor after filling, i.e. sealing an end of the motor after the fluid has been added.

A septum or rubber plug is inserted in the bottom of the motor shaft in a counter bore which leads to a fluid reservoir for the bearing. The air-tight seal is also achieved by a temporary O-ring around the sides of the shoulder at the end of the shaft closing off the end of the bearing normally open to the surrounding environment.

A needle is then inserted into the shaft via the septum, and the other end of the needle is placed in the oil that will be drawn into the motor. The motor, needle and container for the oil are placed in a vacuum chamber which is evacuated; the resulting pressure differential causes the air within the motor to exit through the needle and up through the oil. After all the air is withdrawn from the motor, the vacuum chamber's pressure is slowly returned to the ambient pressure causing oil to flow up through the needle into the vacuum which is now created within the bearing.

While the vacuum is established, the oil is degassed and may also be heated. After filling, the motor can be removed from the vacuum chamber, the needle is withdrawn from the septum (which reseals), and the O-ring removed from the journal.

7 Claims, 2 Drawing Sheets

STEP 1. EVACUATE CHAMBER TO 50 MTORR – AIR IN MOTOR EXPELLED.
STEP 2. LET AIR BACK INOT CHAMBER SLOWLY – OIL FORCED INTO MOTOR.
STEP 3. REMOVE MOTOR FROM CHAMBER AND FIXTURE AND REMOVE O-RING.

VACUUM FILL TECHNIQUE DECRIPTION

VACUUM FILL TECHNIQUE DECRIPTION

VACUUM FILL TECHNIQUE FOR HYDRODYNAMIC BEARING

FIELD OF THE INVENTION

The present invention relates to the field of hydrodynamic bearing assemblies of the type which provides support and rotation for a high-speed spindle element. More specifically, the present invention relates to improved method and apparatus for filling a hydrodynamic bearing with fluid.

RELATED APPLICATIONS

The invention disclosed herein will find uses in many different types of hydrodynamic bearing assemblies; an example of such a hydrodynamic bearing is found in U.S. Ser. No. 08/521,611 entitled "ABSORBENT OIL BARRIER FOR HYDRODYNAMIC BEARING", invented by Parsoneault and Leuthold and assigned to the assignee of the present application and incorporated herein by reference.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways, transmit this surface structure as well as their imperfection in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relative high viscosity of oil allows for larger bearing gaps and therefore greater tolerances to achieve similar dynamic performance.

Thus, in the case of a hydrodynamic bearing employing a liquid lubricant, the lubricating liquid must be reliably loaded into the bearing in order to maximize the load bearing capacity of the bearing. It is especially important to avoid the presence of any air bubbles within the oil carrying region of the bearing. With maximum oil fill in the hydrodynamic bearing, a stiffer motor is created.

The absence of air bubbles will minimize the pressure build-up inside the motor due to drops in ambient pressure and/or thermal expansion from increased temperature. This is due to the fact that while air bubbles will expand with changes in pressure or temperature, oil has little change in volume with such changes.

As little as 10% air in a typical fluid bearing could theoretically cause leakage through the seals at the ends of the bearings if the bearing is being stored at 70° C. Such failure of the bearing to contain the lubricant would cause contaminants to be expelled into the head disc region of the disc drive. The loss of some bearing fluid could cause the physical surfaces of the spindle and housing to contact one another, leading to increased wear and eventual failure of the bearing system.

Known techniques for filling the hydrodynamic bearing with oil require that the motor be capped after filling, i.e. that the entry channel for injecting the oil or other fluid into the bearing be closed and sealed after the oil is inserted. This is a difficult and complex process which easily results in the entrapment of air.

In view of the many long term benefits of a reliable hydrodynamic bearing design, the establishment of a reliable process for injecting fluid into the hydrodynamic bearing without allowing the entrapment of any air is highly desirable.

SUMMARY OF THE INVENTION

It is therefore an objective of the present invention to provide a fill technique for hydrodynamic bearings which is simple and reliable and adaptable to mass production techniques.

It is a further objective to provide such a process which results on a repeatable basis of the injection of the desired amount of oil or other fluid into the hydrodynamic bearing without entrapping any bubbles into the fluid.

It is a related objective of the invention to provide for a process wherein the oil may be degassed immediately before injection, so that the possibility of bubbles appearing in the oil is minimized.

A further objective of the invention is to provide a method and apparatus eliminating the need for capping the motor after filling i.e. sealing an end of the motor after the fluid has been added.

These and other objectives of the present invention are achieved by assembling at least as much of the motor as to define all the regions where oil or other fluid will be incorporated in the hydrodynamic bearing, and sealing off any opening of the bearing volume to create an air-tight seal around the volume. In a preferred embodiment, a septum or rubber plug is inserted in the bottom of the motor shaft in a counter bore which leads to a fluid reservoir for the bearing. The air-tight seal is also achieved by in a preferred embodiment of the process by incorporating a temporary O-ring around the sides of the shoulder at the end of the shaft closing off the end of the bearing normally open to the surrounding environment.

A needle is then inserted into the shaft via the septum, and the other end of the needle is placed in the oil that will be drawn into the motor. The motor, needle and container for the oil are placed in a vacuum chamber which is evacuated; the resulting pressure differential causes the air within the motor to exit through the needle and up through the oil. After all the air is withdrawn from the motor, the vacuum chamber's pressure is slowly returned to ambient pressure causing oil to flow up through the needle into the vacuum which is now created within the bearing.

While the vacuum is established, the oil is degassed and may also be heated. Heating thins the oil, and speeds the filling process. After filling the motor can be removed from the vacuum chamber, the needle is withdrawn from the septum (which reseals), and any means added for temporarily sealing the bearing volume from the outside air (such as the O-ring) are removed from the journal.

The method may be utilized with either a partially or fully assembled motor, and is useful with hydrodynamic bearing of many designs. The method is explained below with reference to a particular motor model with which it has proven especially useful. However, the scope of the present invention is not limited to its utilization with this single motor model.

Other features and advantages of the present invention will become apparent to a person of skill in the art who studies the following detailed description of a preferred embodiment of the method of apparatus for the present invention given in conjunction with the accompanying drawings.

DETAILED DESCRIPTION OF A PREFERRED EMBODIMENT

Figure 1:
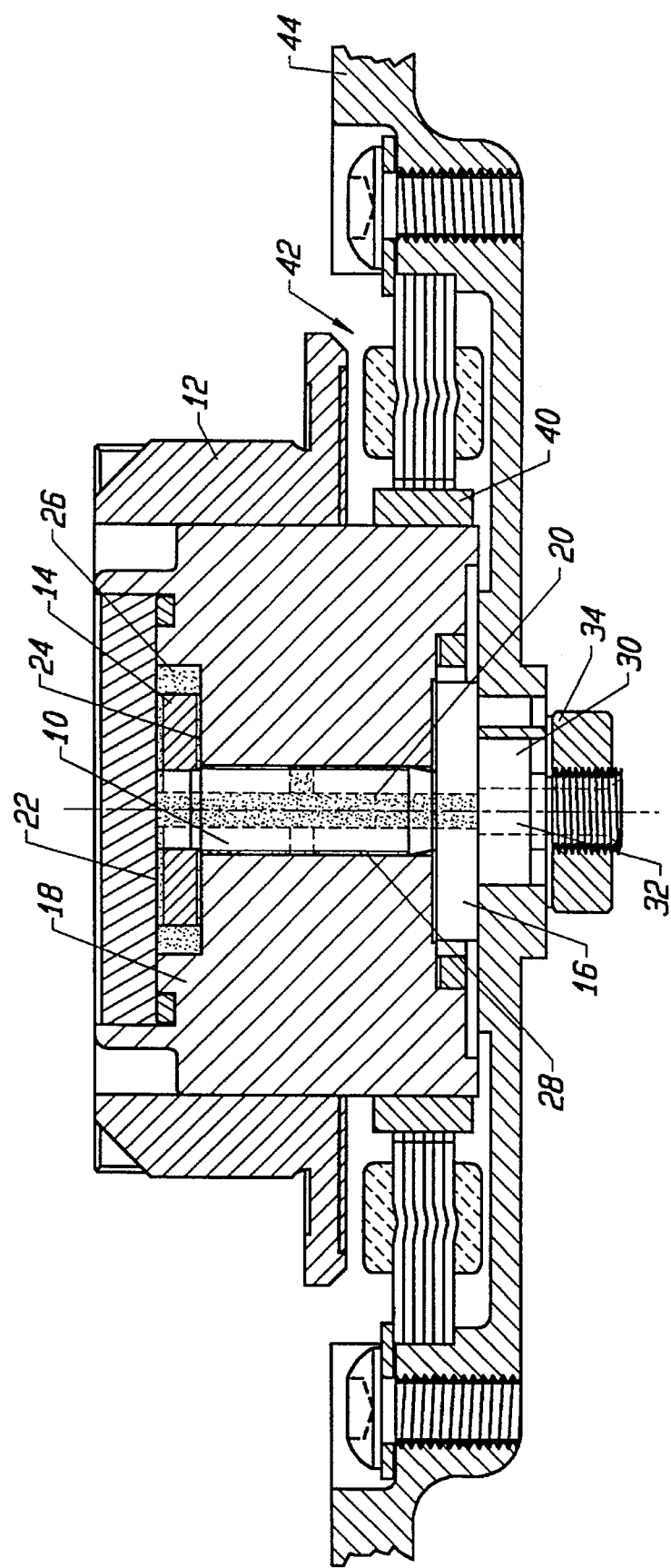
FIG. 1 illustrates a typical hydrodynamic bearing motor with which the invention is useful.

The description to follow of a preferred embodiment of the present invention teaches a highly efficient vacuum fill technique for inserting the lubricating oil into a hydrodynamic bearing which is shown incorporated into a spindle motor for a hard disc drive. The technique is useful in any hydrodynamic bearing which is of a structure that can be adapted to have an air-tight seal around the entire bearing volume. Hydrodynamic bearings have many uses other than in hard disc drives and the invention is not intended to be limited to uses in such an environment. However, it is especially useful in hydrodynamic bearings for hard disc drives because of the importance of not having any residual fluid either leak out of the motor or be expelled from the bearing over the entire life of the bearing, as such would contaminate the atmosphere within the hard disc drive with droplets or outgassing.

It is always a major concern in the design of a hydrodynamic hard disc drive spindle motor to ensure that the lubricant or fluid is confined to the region where it lubricates the rotating surfaces, and cannot migrate to the regions where the data storing discs are located.

The basic principles of the invention will be explained with respect to a hydrodynamic bearing utilized in a spindle motor whose description may be found in greater detail in U.S. Ser. No. 08/545,514 entitled "HYDRODYNAMIC BEARING ASSEMBLY WITH SINGLE SIDED GROOVE COUNTERPLATE" invented by Heine, Leuthold, Nagarathman, Jennings and Parsoneault, filed contemporaneously herewith and incorporated herein by reference. The basic structure of the motor, or at least as much as is relevant to this invention, includes a stationary shaft 10 and a hub 12 which rotates around the shaft. The shaft includes a thrust plate 14 at one end, and ends in a shoulder 16 at the opposite end. The hub includes a counterplate. One of the two opposing surfaces of the shaft/thrust plate assembly and the hub/counterplate assembly typically carries cylindrical sections of spiral grooves as is well known in this technology. The fluid is supplied to all the lubricated surfaces from a reservoir 20 which runs through the center of the shaft 10. The lubricated surfaces include both the top and bottom sides 22, 24 of the thrust plate, the outside diameter 26 of the thrust plate, and the outside surface 28 of the circular shaft. The number and location of lubricated surfaces is not significant to this invention; what is important is that they be in communication with a reservoir into which the fluid is to be inserted during the filling process.

The remaining elements of the motor which are of structural significance to this description are the support plate 30 which is located below the shoulder and includes a septum or rubber plug 32 in its center bore; and a nut 34 located below the counterplate 30 which is necessary to hold the primary structural elements of the motor together and holds the motor into base.

In FIG. 1, the magnet 40 and stator 42 as well as assembly base element 44 are also shown. However, the process to be described below is more easily executed if these parts have not yet been added to the assembly. As noted above, it is primarily important that all the elements of the hydrodynamic bearing be assembled, together with such supporting or surrounding elements as to ensure an air-tight seal around the bearing volume. This air-tight seal may be achieved either by the bearing as designed, or in the present invention, referring next to FIG. 2, by the addition of a temporary O-ring 60 which surrounds the shoulder and seals the end of the hydrodynamic bearing journal which is otherwise left open to the normal atmosphere of the location where the motor is to be used. In practice, hydrodynamic bearings are rarely completely sealed from the atmosphere where the bearing or motor is used; thus an element such as the O-ring 60 to create a temporary air-tight seal so that a vacuum may be established within the bearing is necessary.

Figure 2:
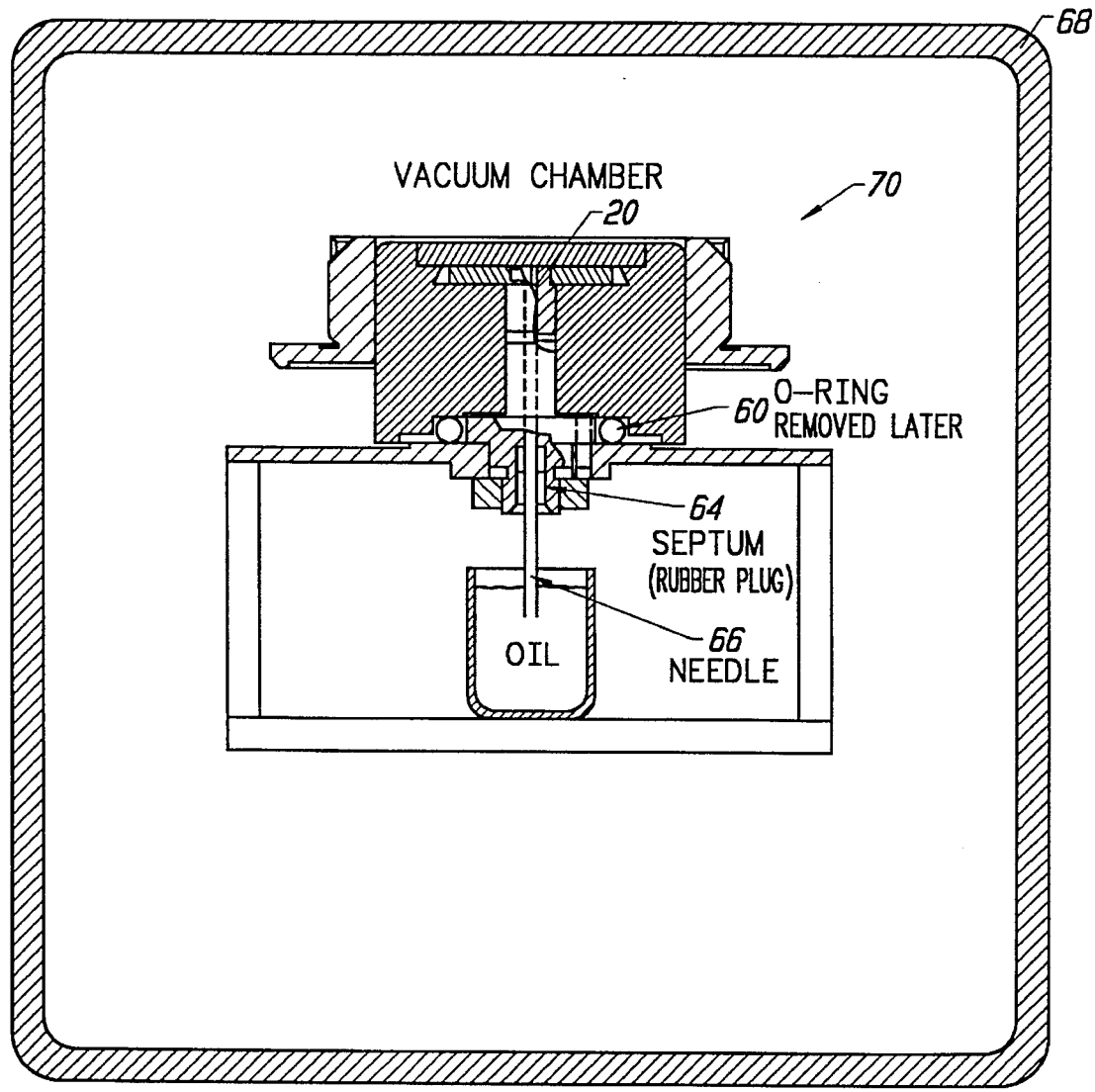
FIG. 2 illustrates apparatus for implementing the present method and will also be used to explain the steps of the method of the present invention.

Also shown in FIG. 2 is a septum 64 which is a rubber plug which creates an air-tight seal at an access hole which is in direct communication with the fluid carrying region of the hydrodynamic bearing. In this case, the septum plugs the access hole which leads to a reservoir 20 through the shaft 28 of the motor. It is preferable to provide access directly to a region of the bearing which serves as a reservoir so that the oil may flow more easily first into the reservoir and then be distributed through the rest of the motor.

Next a hypodermic needle or equivalent path for fluid flow is inserted into the reservoir 20 through the septum 64. This establishes the only path into or out of the motor during execution of the process. The other end of the needle is placed in the oil that will later be drawn into the motor.

The motor, needle and oil are placed in a vacuum chamber 68 as shown in FIG. 2. It can be seen that it is easiest to establish this assembly if the motor cartridge 70 and needle are inserted into the vacuum chamber before completing the complete assembly of the motor cartridge. In this case, the magnet, stator, and base support casting have not yet been added to the motor. However, by using a different type of fixture, such alternative approach to the process could clearly be executed.

The chamber is next evacuated down to a substantially reduced pressure, preferably about 50 mTorr, while the temperature in the chamber is increased, in this example is 65° C. During the evacuation process, the air within the motor expands, and due to the differences in pressure, exits through the needle, bubbling up through the oil. Meanwhile, the oil is degassed, as its viscosity drops with temperature.

Once the optimum pressure and temperature have been reached, and the bearing is evacuated of air the cycle is reversed and the vacuum chamber pressure is slowly returned to normal atmosphere pressure. This forces the oil through the needle into the hydrodynamic bearing in the motor. Since all the air has been forced out of the hydrodynamic bearing, the oil replaces the now evacuated air and fills every region within the air-tight hydrodynamic bearing. Since no air is present within the bearing and the oil completely fills the bearing, a bubble free fill is achieved. Because the oil will not significantly expand or contract with changes in pressure or temperature, (but air does change) use of the described method to fill the hydrodynamic bearing provides important advantages to a manufacturer.

As a final step in the process, the motor is removed from the vacuum chamber, the needle 66 is withdrawn from the septum 64 which reseals, and the O-ring 60 is removed from the bottom of the journal. At this point, some residual oil may need to be cleaned from the seat for the O-ring.

The magnets, flux shield, and base of the stator all shown in the exemplary motor of FIG. 1, are then added to the motor to complete its assembly. Until the assembly is complete, or access to the septum is plugged with epoxy, the septum remains accessible. Thus, if reworking of the motor is necessary after testing, such can be easily achieved.

The present invention provides a batch process utilizing simple fixturing high speed execution and easily repeatability, bubble free filling of the hydrodynamic bearing is achieved on a continuing basis. Simultaneously, degassing of the oil immediately before injection into the motor is provided, thereby further diminishing the possibility of air bubbles existing within the hydrodynamic bearing. Moreover, the capping step utilized in known prior art processes is eliminated.

It should further be apparent to someone who reads this disclosure that although specific temperatures and pressures have been described above for executing the process, other temperatures and pressures will be useful in executing the process, depending on the circumstances.

Other features and advantages of the present invention may occur to a person of skill in the art who studies the present invention disclosure. Therefore, the scope of the present invention is to be limited only by the following claims.

What is claimed is:

1. An improved method for filling a hydrodynamic bearing with liquid comprising the steps of establishing an air-tight seal around the entire bearing volume, establishing a pathway from a source of liquid into the hydrodynamic bearing, placing the bearing and liquid in a vacuum chamber, evacuating the vacuum chamber to a sufficiently low pressure that the air within the bearing will expand and exit through the pathway and through the liquid, slowly returning the ambient pressure surrounding the bearing and liquid to ambient pressure, and removing the pathway into the hydrodynamic bearing, leaving the bearing filled with liquid.

2. A method as claimed in claim 1 wherein the hydrodynamic bearing includes a reservoir region, and a septum which seals an access hole into said reservoir through which the pathway may be repeatably established.

3. A method as claimed in claim 2 wherein said hydrodynamic bearing is incorporated in a spindle motor and forms the bearing between a stationary shaft and a bushing rotating about said motor, said shaft ending at one end with a thrust plate which horizontally overlies a portion of said bushing, and said method further comprising inserting an O-ring to plug an opening defined between said shaft and said bushing to create said air-tight seal around said hydrodynamic bearing during execution of said process.

4. A process as claimed in claim 3 wherein the temperature in the chamber is increased while the pressure is reduced, so that the air expands and exits while the liquid is degassed to minimize the likelihood of air bubbles in the liquid as it passes into the hydrodynamic bearing.

5. A process as claimed in claim 4 wherein the pressure in said chamber is evacuated down to about 50 mTorr.

6. A process as claimed in claim 4 wherein the temperature of said liquid is increased to about 65° C.

7. A process as claimed in claim 1 wherein after the pressure is reduced to the target pressure and the temperature is increased to the target temperature, the vacuum chamber is slowly returned to ambient pressure while said temperature is maintained at said elevated temperature level.

* * * * *